(12) United States Patent
Thornhill (10) Patent No.: US 8,707,779 B2
(45) Date of Patent: Apr. 29, 2014

(54) INTERNAL LIQUID MEASUREMENT AND MONITORING SYSTEM FOR A THREE PHASE SEPARATOR

(76) Inventor: Samuel E. Thornhill, Fruita, CO (US)

(*) Notice: Subject to any disclaimer, the term of this patent is extended or adjusted under 35 U.S.C. 154(b) by 466 days.

(21) Appl. No.: 13/077,921

(22) Filed: Mar. 31, 2011

(65) Prior Publication Data

US 2011/0240365 A1     Oct. 6, 2011

Related U.S. Application Data

(60) Provisional application No. 61/319,517, filed on Mar. 31, 2010.

(51) Int. Cl.
    *G01F 15/08*     (2006.01)
    *G01F 1/44*     (2006.01)
    *G01F 1/74*     (2006.01)

(52) U.S. Cl.
    USPC ........ 73/200; 73/861.63; 73/861.04; 210/741

(58) Field of Classification Search
    None
    See application file for complete search history.

(56) References Cited

U.S. PATENT DOCUMENTS

| | | | |
|---|---|---|---|
| 4,727,489 A * | 2/1988 | Frazier et al. | 702/13 |
| 5,205,310 A * | 4/1993 | Kolpak et al. | 137/2 |
| 6,257,070 B1 * | 7/2001 | Giallorenzo et al. | 73/861.04 |
| 2007/0006727 A1 * | 1/2007 | Gysling | 95/1 |
| 2008/0060846 A1 * | 3/2008 | Belcher et al. | 175/25 |
| 2008/0163692 A1 * | 7/2008 | Huang et al. | 73/627 |
| 2010/0140140 A1 * | 6/2010 | Allouche | 208/187 |
| 2012/0285896 A1 * | 11/2012 | Black | 210/741 |

* cited by examiner

*Primary Examiner* — Harshad R Patel
(74) *Attorney, Agent, or Firm* — Sinorica, LLC (57) ABSTRACT

A system for measuring and monitoring the internal liquid within a three phase separator allows a user to accurately and reliably calculate the volumetric flow rate of the liquids exiting the three phase separator. For each liquid inside of the three phase separator, a differential pressure device is attached to where the extension fitting enters its respective liquid. Once a dump valve is actuated, the extension fitting guides its respective liquid out of the three phase separator, and the differential pressure device creates a differential pressure within the respective liquid. A sensor reads the differential pressure through a pair of sensing lines. The sensor relays the differential pressure reading to an RTU flow computer that calculates the volumetric flow rate of the liquid exiting the three phase separator. The calculation is then sent to a SCADA system, which allows the user to observe the volumetric flow rate in real time.

20 Claims, 6 Drawing Sheets

INTERNAL LIQUID MEASUREMENT AND MONITORING SYSTEM FOR A THREE PHASE SEPARATOR

The current application claims a priority to the U.S. Provisional Patent application Ser. No. 61/319,517 filed on Mar. 31, 2010.

FIELD OF THE INVENTION

The present invention generally relates to the measurement and monitoring of the oil and water produced from a three phase separator. The information provided by the present invention in addition to the traditional gas measurement system generates the three phase measurement results from well production.

BACKGROUND OF THE INVENTION

Traditional meters have had difficulties measuring the volumetric flow rate of liquids exiting a three phase separator. An inlet allows a mixture of fluids to enter a three phase separator. The mixture of fluids consists of two liquids and a gas. The gas is emptied out of the three phase separator by a gas outlet. A dump valve siphons a liquid, such as water or oil, out of the three phase separator by extending the siphon into the liquid with an extension fitting. The liquid is carried away from the three phase separator along a dump liquid line. Tradition meters measure the volumetric flow rate of the liquid being carried along the dump liquid line.

Some traditional meters include differential pressure meters, positive displacement meters, velocity meters, and mass meters. Differential pressure meters, also known as head meters, are installed on the dump liquid lines outside of the three phase separator. Differential pressure meters experience problems with gas in the dump liquid lines because these meters are not completely submerged in the liquid being measured. Gas bubbles form in the sensing lines of these meters and create inaccurate readings. Differential pressure meters need to be continuously maintained by bleeding the gas bubbles from the sensing lines. Positive displacement meters have problems with installation, moving parts being damaged, accuracy, and reliability. Velocity meters undergo problems with installation, moving parts being damaged, accuracy, reliability, cost, conductivity of liquids, sensor coating, and noise interference. Mass meters experience problems with installation, cost, reliability, errors caused by gas pockets in the exiting liquids, noise interference, and intermittent slug errors.

Problems with the traditional meters are solved by an internal liquid measurement and monitoring system. A pressure differential device such as a venturi tube is attached to the extension fitting, which submerges the pressure differential device in the liquid being measured. The sensing lines conveys the differential pressure to the sensor, which sends the measurement to an RTU flow computer. The RTU flow computer uses the pressure differential reading to calculate the volumetric flow rate of the liquid exiting the three phase separator. The RTU flow computer sends the volumetric flow rate calculation to a SCADA system, which records the calculation. The volumetric flow rate calculations are made in real time, and the SCADA system archives the calculations being made. This system has proven to be an accurate and reliable method to measure the volumetric flow rate through a dump valve, which allows operators to easily monitor and troubleshoot problems such as a leaking dump valve or a dump valve being stuck open.

DETAIL DESCRIPTIONS OF THE INVENTION

All illustrations of the drawings are for the purpose of describing selected versions of the present invention and are not intended to limit the scope of the present invention.

Figure 1:
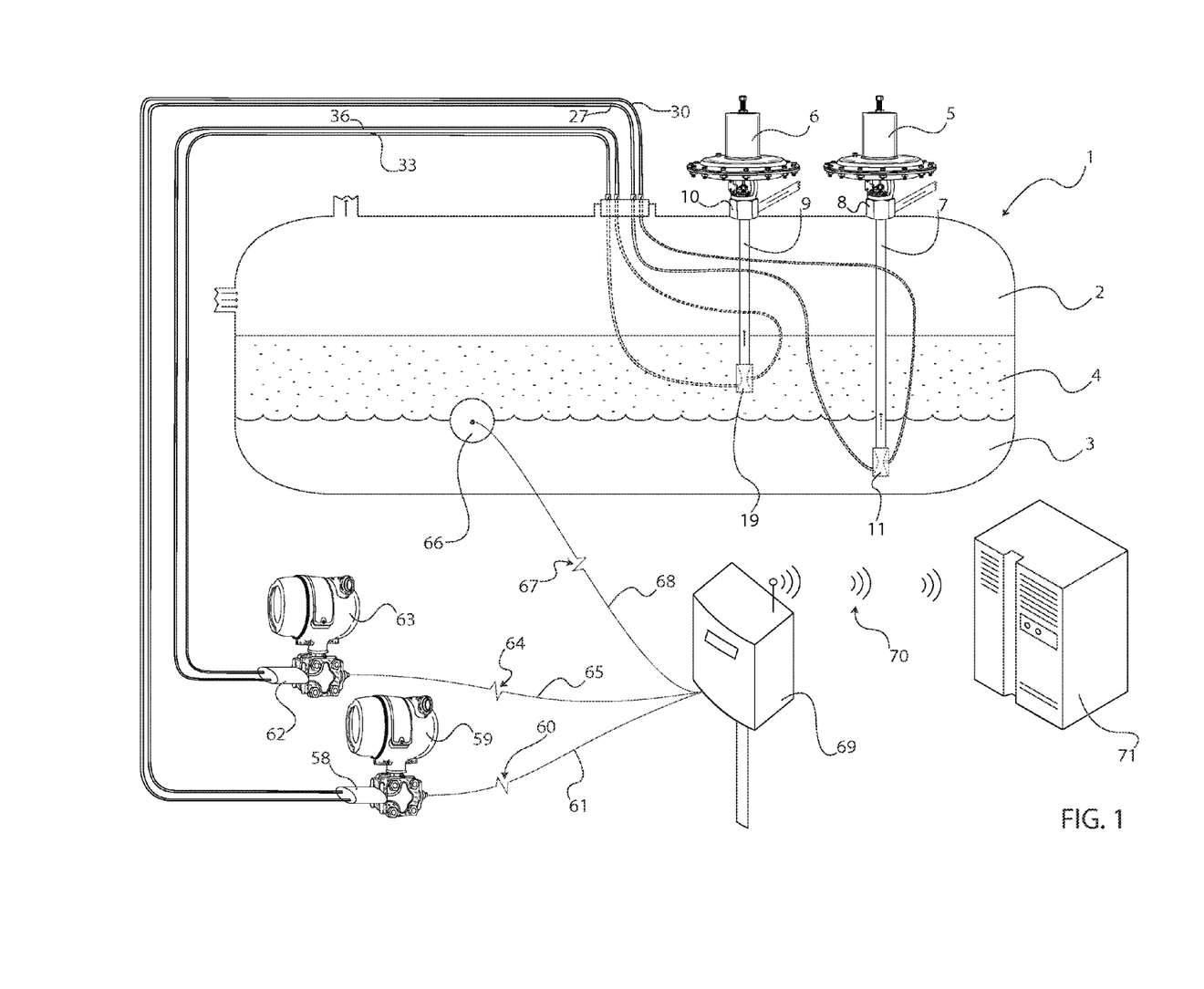
FIG. 1 illustrates the present invention in its entirety with the sensing lines exiting the three phase separator through the inspection plug hole.
Figure 2:
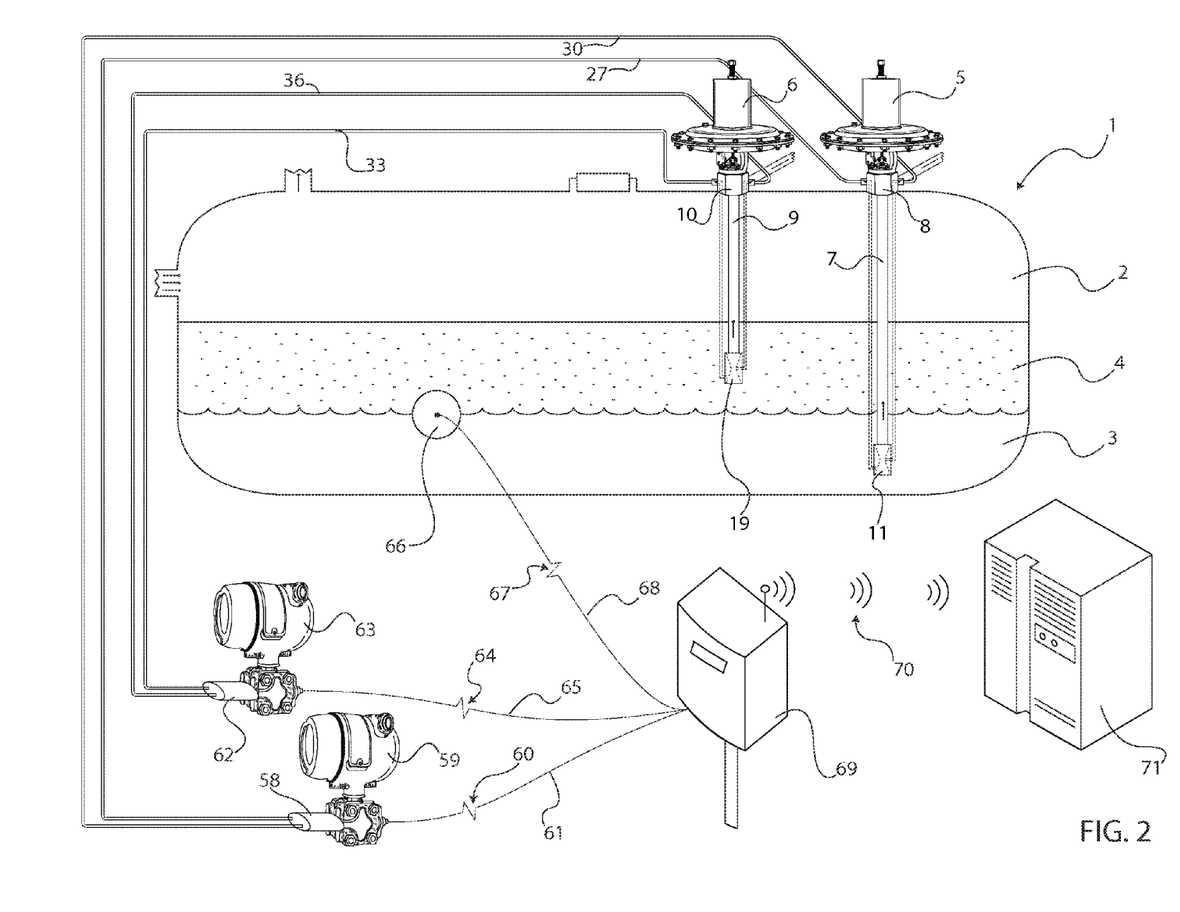
FIG. 2 also illustrates the present invention in its entirety but with the sensing lines exiting the three phase separator through the water extension fitting and the oil extension fitting.

As can be seen in FIGS. 1 and 2, the present invention is an internal liquid measurement and monitoring system for a three separator. The three phase separator 1 is a cylindrical vessel that separates a mixture into its constitute fluids with a combination of pressure and gravity. In petroleum engineering, a three phase separator 1 is used to separate a mixture that consists of gas 2, liquid water 3, and liquid oil 4. A water dump valve 5 empties the liquid water 3 out of the three phase separator 1, and an oil dump valve 6 empties the liquid oil 4 out of the three phase separator 1. The water dump valve 5 and the oil dump valve 6 are both siphon liquid dump valves and are located on the top of the three phase separator 1. The water dump valve 5 empties the liquid water 3 out of the three phase separator 1 by penetrating the three phase separator 1 with a water extension fitting 7, which attaches to the bottom of the water dump valve 5. The oil dump valve 6 empties the liquid oil 4 out of the three phase separator 1 by penetrating the three phase separator 1 with an oil extension fitting 9, which attaches to the bottom of the oil dump valve 6. The water extension fitting 7 is a tube with a water dump valve body 8 and the oil extension fitting 9 is a tube with an oil dump valve body 10, both of which extend the siphon of the water dump valve 5 and the siphon of the oil dump valve 6 into their respective liquids. The length of the water extension fitting 7 and the length of the oil extension fitting 9 are determined by the vertical location of the liquid water 3 and the liquid oil 4 in the three phase separator 1.

The method begins by creating a differential pressure in the liquid water 3 and the liquid oil 4 as the liquid water 3 and the liquid oil 4 flow out of the three phase separator 1 through the water dump valve 5 and the oil dump valve 6. To create a differential pressure as the liquid water 3 production flows out of the three phase separator 1, a water differential pressure device 11 is attached to the water extension fitting 7. Similarly, to create a differential pressure as the liquid oil 4 flows out of the three phase separator 1, an oil differential pressure device 19 is attached the oil extension fitting 9. In the preferred embodiment of the present invention, the water differential pressure device 11 and the oil differential pressure device 19 are venturi tubes. The venturi tubes would allow the liquid water 3 and the liquid oil 4 to flow out of the three phase separator 1 relatively unrestricted. In addition, the venturi tube remains accurate because it does not have any moving parts that require maintenance. The venturi tube can be sized to measure the volumetric flow rate of any fluid. Other embodiments of the water pressure differential device and the oil pressure differential device include orifices, conical orifice plates, quadrant edge, orifice plates, segmental wedges, integral wedges, flow tubes, flow nozzles, pilot tubes, elbow meters, target meters, and variable-area meters also known as rotameters.

Figure 3:
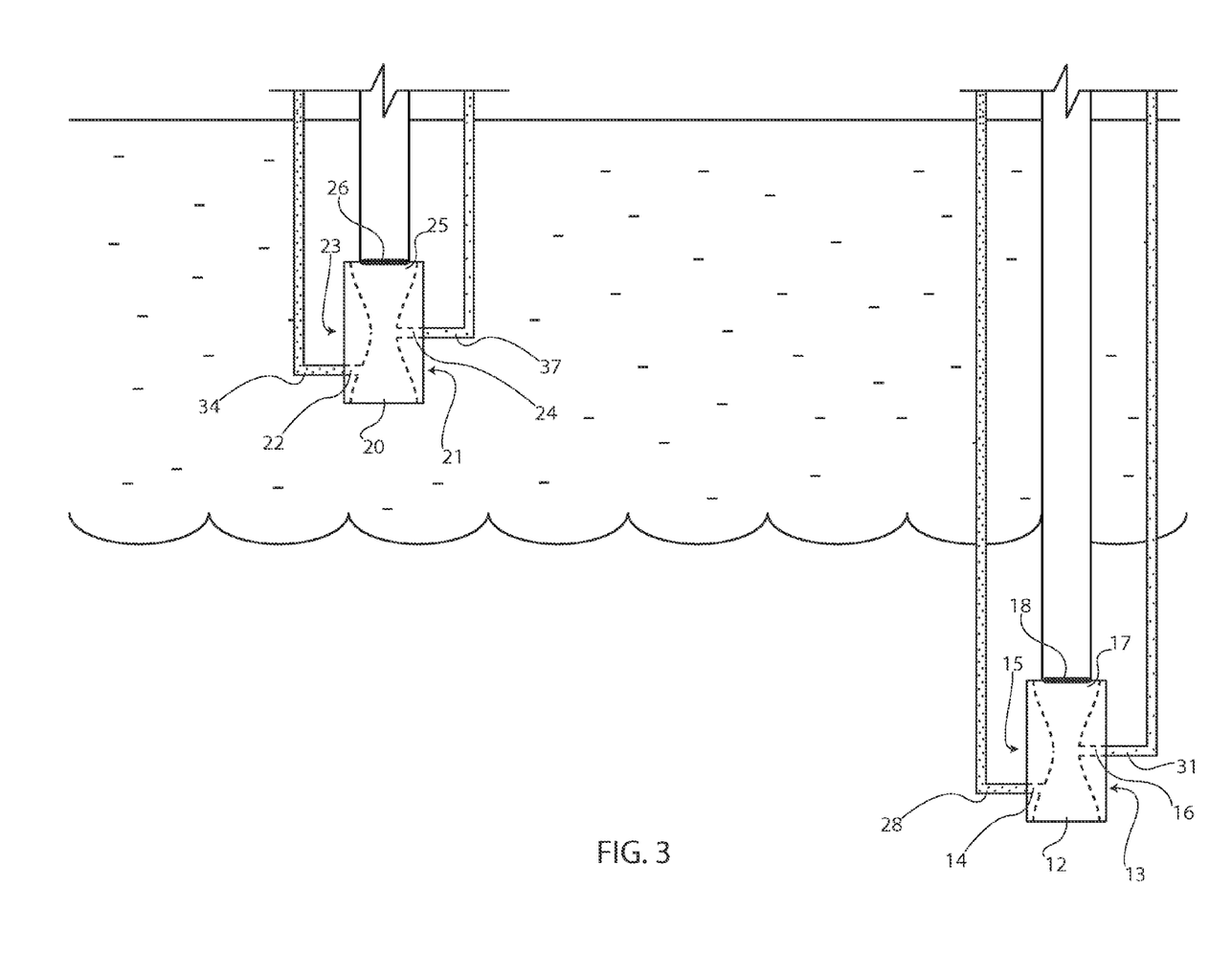
FIG. 3 is a magnified view of the water differential pressure device and the oil differential pressure device.

As can be seen in FIG. 3, the water differential pressure device 11 comprises of a water inlet 12, a high water pressure section 13, a high water pressure tap 14, a low water pressure section 15, a low water pressure tap 16, a water outlet 17, and a first adhesive 18. The water inlet 12 allows the liquid water 3 to enter the water differential pressure device 11. The water inlet 12 leads the liquid water 3 into the high water pressure section 13, which is followed by the low water pressure section 15. The high water pressure tap 14 is positioned on high water pressure section 13, and the low water pressure tap 16 is positioned on the low water pressure section 15. The water outlet 17 leads the liquid water 3 out of the water differential pressure device 11 and into the water extension fitting 7, which is connected to the water outlet 17 by the first adhesive 18.

Likewise, the oil differential pressure device 19 comprises of an oil inlet 20, a high oil pressure section 21, a high oil pressure tap 22, a low oil pressure section 23, a low oil pressure tap 24, an oil outlet 25, and a second adhesive 26, which are shown in FIG. 3. The oil inlet 20 allows the liquid oil 4 to enter the oil differential pressure device 19. The oil inlet 20 leads the liquid oil 4 into the high oil pressure section 21, which is followed by the low oil pressure section 23. The high oil pressure tap 22 is positioned on high oil pressure section 21, and the low oil pressure tap 24 is positioned on the low oil pressure section 23. The oil outlet 25 leads the liquid oil 4 out of the oil differential pressure device 19 and into the oil extension fitting 9, which is connected to the oil outlet 25 by the second adhesive 26. In both the water differential pressure device 11 and the oil differential pressure device 19, the low water pressure section 15 and the low oil pressure section 23 have a smaller cross section than the high water pressure section 13 and the high oil pressure section 21. The smaller cross section increases the line velocity of a fluid, which in turn decreases the static pressure of the fluid. The difference in pressure between the larger cross section and the smaller cross section is known as the differential pressure.

In order to detect the differential pressure of the liquid water 3, a high water pressure sensing line 27 is attached to the high water pressure section 13, and a low water pressure sensing line 30 is attached to the low water pressure section 15, which are shown in FIG. 3. The high water pressure sensing line 27 and the low water pressure sensing line 30 are tubes filled with liquid water 3. The high water pressure sensing line 27 comprises of a high water pressure device end 28 and a high water pressure manifold end 29. The high water pressure device end 28 is connected to the high water pressure tap 14, which allows the liquid water 3 filling the high water pressure sensing line 27 to experience the higher static pressure. The low water pressure sensing line 30 comprises of a low water pressure device end 31 and a low water pressure manifold end 32. The low water pressure device end 31 is connected to the low water pressure tap 16, which allows the liquid water 3 filling the low water pressure sensing line 30 to experience the lower static pressure. The liquid water 3 within both the high water pressure sensing line 27 and the low water pressure sensing line 30 must be purged of all gas bubbles; otherwise the differential pressure of the liquid water 3 in the water differential pressure device 11 will not be the same as the differential pressure of the liquid water 3 within the high water pressure sensing line 27 and the low water pressure sensing line 30.

Similarly, in order to detect the differential pressure of the liquid oil 4, a high oil pressure sensing line 33 is attached to the high oil pressure section 21, and a low oil pressure sensing line 36 is attached to the low oil pressure section 23, which are shown in FIG. 3. The high oil pressure sensing line 33 and the low oil pressure sensing line 36 are tubes filled with liquid oil 4. The high oil pressure sensing line 33 comprises of a high oil pressure device end 34 and a high oil pressure manifold end 35. The high oil pressure device end 34 is connected to the high oil pressure tap 22, which allows the liquid oil 4 filling the high oil pressure sensing line 33 to experience the higher static pressure. The low oil pressure sensing line 36 comprises of a low oil pressure device end 37 and a low oil pressure manifold end 38. The low oil pressure device end 37 is connected to the low oil pressure tap 24, which allows the liquid oil 4 filling the low oil pressure sensing line 36 to experience the lower static pressure. The liquid oil 4 within both the high oil pressure sensing line 33 and the low oil pressure sensing line 36 must be purged of all gas bubbles; otherwise the differential pressure of the liquid oil 4 in the oil differential pressure device 19 will not be the same as the differential pressure of the liquid oil 4 within the high oil pressure sensing line 33 and the low oil pressure sensing line 36. In addition, a plurality of shut-off valves 39 are located along the high water pressure sensing line 27, the low water pressure sensing line 30, the high oil pressure sensing line 33, and the low oil pressure sensing line 36. The plurality of shut-off valves 39 close the sensing lines to prevent any liquid water 3 or liquid oil 4 from escaping the three phase when the system needs to be isolated for maintenance or repairs.

Figure 5:
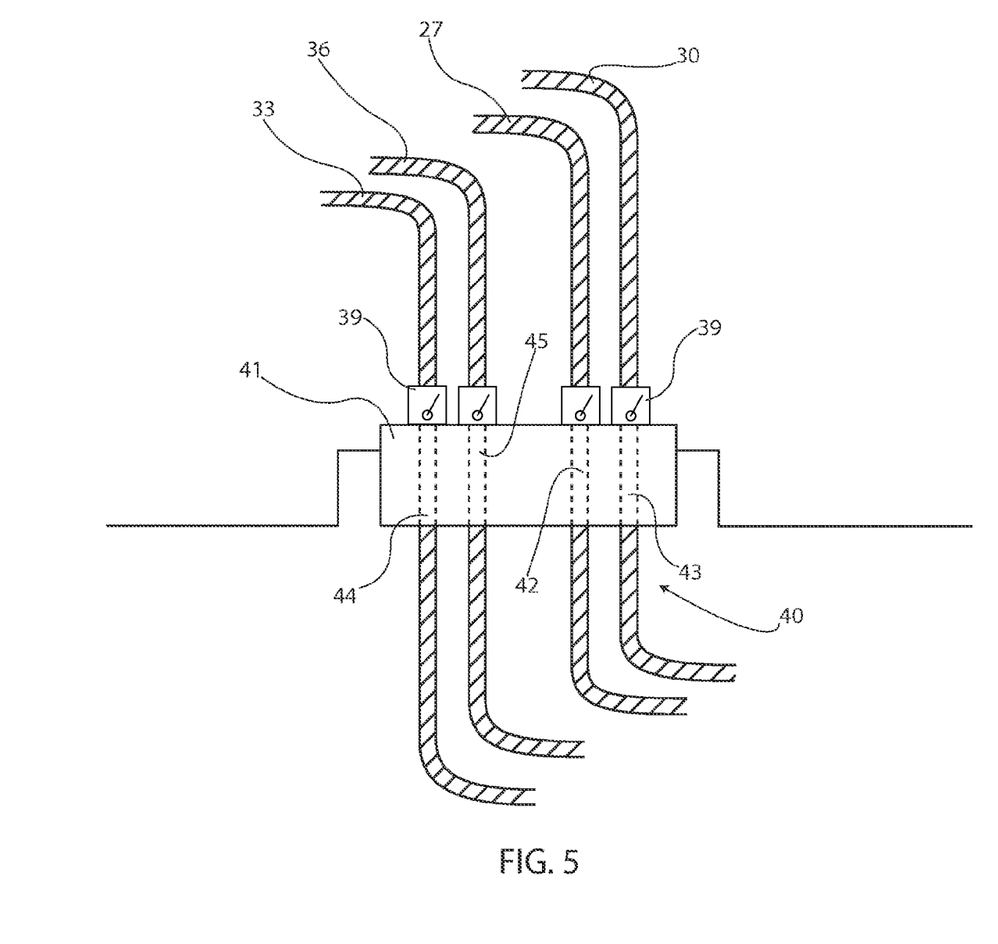
FIG. 5 is an enlarged view of the replacement fitting.

The high water pressure sensing line 27 and the low water pressure sensing line 30 must exit the three phase separator 1 before being able to connect to a first manifold 58. Likewise, the high oil pressure sensing line 33 and the low oil pressure sensing line 36 must exit the three phase separator 1 before being able to connect to a second manifold 62. A three phase separator exit can be crafted by two different methods: an inspection plug hole method that is illustrated in FIG. 1 and an extension fitting method that is illustrated in FIG. 2. The inspection plug hole method requires a replacement fitting 41, which comprises of a high water pressure fitting hole 42, a low water pressure fitting hole 43, a high oil pressure fitting hole 44, and a low oil pressure fitting hole 45, which are shown in FIG. 5. The replacement fitting 41 is designed to replace an inspection plug which covers an inspection plug hole 40 on the three phase separator 1. The high water pressure fitting hole 42 allows the high water pressure sensing line 27 to traverse through the replacement fitting 41 and connect to the first manifold 58. The low water pressure fitting hole 43 allows the low water pressure sensing line 30 to traverse through the replacement fitting 41 and connect to the first manifold 58. The high oil pressure fitting hole 44 allows the high oil pressure sensing line 33 to traverse through the replacement fitting 41 and connect to the second manifold 62. The low oil pressure fitting hole 45 allows the low oil pressure sensing line 36 to traverse through the replacement fitting 41 and connect to the second manifold 62. The replacement fitting 41 is hermetically sealed so that nothing but the high water pressure sensing line 27, the low water pressure sensing line 30, the high oil pressure sensing line 33, and the low oil pressure sensing line 36 can pass through the inspection plug hole 40 and exit the three phase separator 1.

Figure 6:
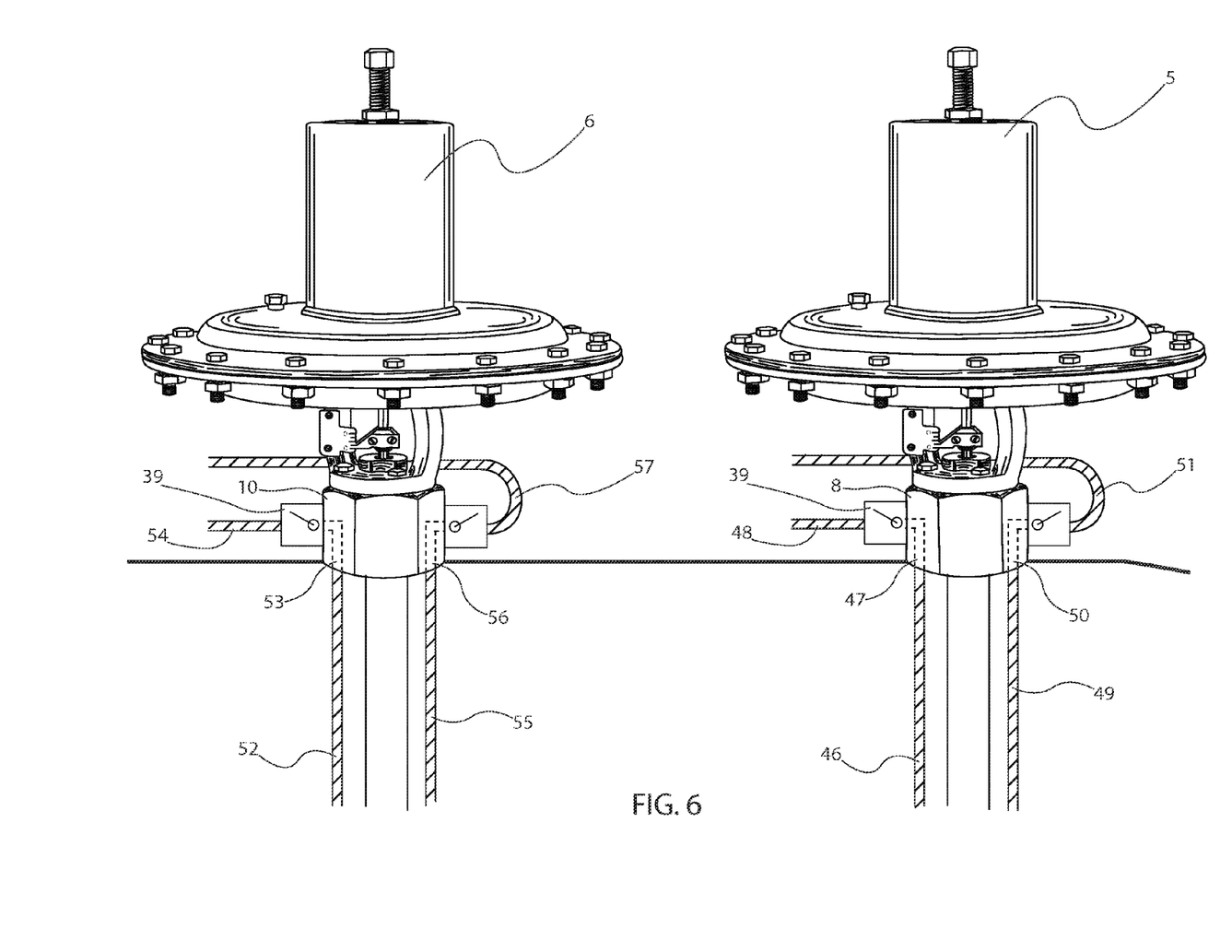
FIG. 6 is an enlarged view of the modified water extension fitting and the modified oil extension fitting.

The extension fitting method requires custom modifications to the water extension fitting 7 and the oil extension fitting 9. For this method, the additional components associated with the water extension fitting 7 include a high water pressure inside tube 46, a high water pressure tunnel 47, a high water pressure outside tube 48, a low water pressure inside tube 49, a low water pressure tunnel 50, and a low water pressure outside tube 51, which are also shown in FIG. 6. Both the high water pressure tunnel 47 and the low water pressure tunnel 50 are holes drilled through the water dump valve body 8 and run parallel to the center axis of the water extension fitting 7. The high water pressure inside tube 46 connects to the high water pressure tap 14 at one end and the high water pressure tunnel 47 at the other end. The high water pressure outside tube 48 engages the high water pressure tunnel 47 at one end and the first manifold 58 at the other end. Together, the high water pressure inside tube 46, the high water pressure tunnel 47, and the high water pressure outside tube 48 form the high water pressure sensing line 27 described above. Likewise, the low water pressure inside tube 49 connects to the low water pressure tap 16 at one end and the low water pressure tunnel 50 at the other end. The low water pressure outside tube 51 engages the low water pressure tunnel 50 at one end and the first manifold 58 at the other end. Together, the low water pressure inside tube 49, the low water pressure tunnel 50, and the low water pressure outside tube 51 form the low water pressure sensing line 30 described above.

Also for the extension fitting method, the additional components associated with the oil extension fitting 9 include a high oil pressure inside tube 52, a high oil pressure tunnel 53, a high oil pressure outside tube 54, a low oil pressure inside tube 55, a low oil pressure tunnel 56, and a low oil pressure outside tube 57, which are also shown in FIG. 6. Both the high oil pressure tunnel 53 and the low oil pressure tunnel 56 are holes drilled through the oil dump valve body 10 and run parallel to the center axis of the oil extension fitting 9. The high oil pressure inside tube 52 connects to the high oil pressure tap 22 at one end and the high oil pressure tunnel 53 at the other end. The high oil pressure outside tube 54 engages the high oil pressure tunnel 53 at one end and the second manifold 62 at the other end. Together, the high oil pressure inside tube 52, the high oil pressure tunnel 53, and the high oil pressure outside tube 54 form the high oil pressure sensing line 33 described above. Similarly, the low oil pressure inside tube 55 connects to the low oil pressure tap 24 at one end and the low oil pressure tunnel 56 at the other end. The low oil pressure outside tube 57 engages the low oil pressure tunnel 56 at one end and the second manifold 62 at the other end. Together, the low oil pressure inside tube 55, the low oil pressure tunnel 56, and the low oil pressure outside tube 57 form the low oil pressure sensing line 36 described above.

The first manifold 58 connects the high water pressure sensing line 27 and the low water pressure sensing line 30 to a first sensor 59, and the second manifold 62 connects the high oil pressure sensing line 33 and low oil pressure sensing line 36 to a second sensor 63. The first manifold 58 and the second manifold 62 are used for the maintenance of the present invention. The first manifold 58 can shut down and isolate either the high water pressure sensing line 27 or the low water pressure sensing line 30. The first manifold 58 can also be used to purge any gas bubbles inside the high water pressure sensing line 27 and the low water pressure sensing line 30. Similarly, the second manifold 62 can shut down and isolate either the high oil pressure sensing line 33 or the low oil pressure sensing line 36. Also, the second manifold 62 can be used to purge any gas bubbles from the high oil pressure sensing line 33 and the low oil pressure sensing line 36.

Figure 4:
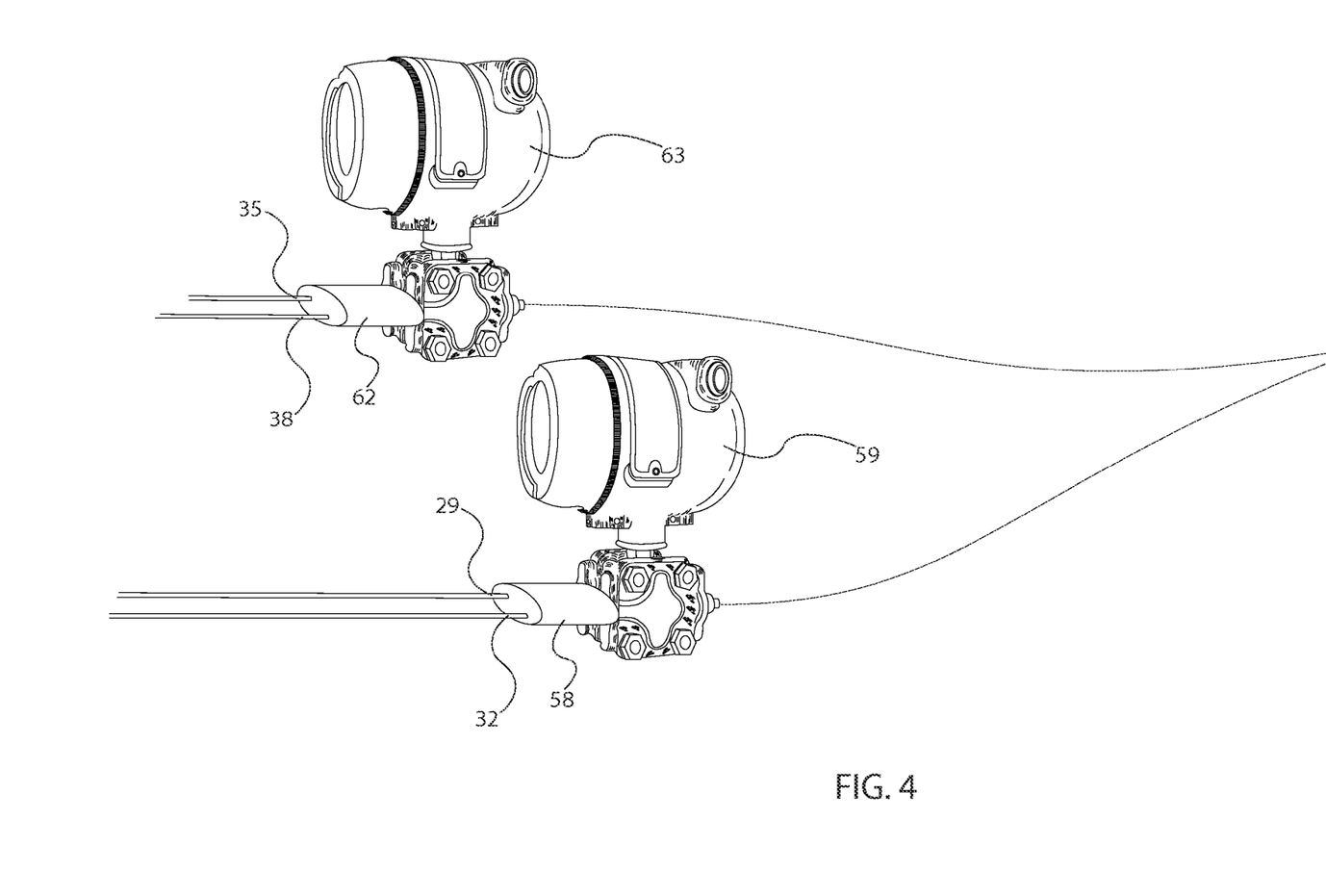
FIG. 4 is a magnified view of the first sensor and the second sensor.

As can be seen in FIGS. 1, 2, and 4, the first sensor 59 is used to convert the physical quantity of static pressure into a first electrical signal 60. The first electrical signal 60 consists of a higher water static pressure reading, a lower water static pressure reading, and a water differential pressure reading, which is the difference between the static pressure of the liquid water 3 in the high water pressure sensing line 27 and the static pressure of the liquid water 3 in the low water pressure sensing line 30. Likewise, the second sensor 63 is used to convert the physical quantity of static pressure into a second electrical signal 64. The second electrical signal 64 consists of a higher oil static pressure reading, a lower oil static pressure reading, and an oil differential pressure reading, which is the difference between the static pressure of the liquid oil 4 in the high oil pressure sensing line 33 and the static pressure of the liquid oil 4 in the low oil pressure sensing line 36. Both the first sensor 59 and the second sensor 63 should be positioned below the lowest liquid level in the three phase separator 1 and positioned as close as possible to the water differential pressure device 11 and the oil differential pressure device 19. The positioning of the first sensor 59 and the second sensor 63 keep the high water pressure sensing line 27, the low water pressure sensing line 30, the high oil pressure sensing line 33, and low oil pressure sensing line 36 as short as possible, which reduces the gauge line error. In the preferred embodiment, the first sensor 59 and the second sensor 63 are differential multivariable transmitters capable of reading static pressure, differential pressure, and temperature. The static pressure, differential pressure, and temperature readings allow the user to calculate the production of a liquid in real time. Any brand of differential multivariable transmitter can be used as long as it meets the class 1, division 1, electrical safety regulations and meets the real time calculation requirements of the ISO (1991) and the ASME (1971).

The RTU (Remote Terminal Unit) flow computer 69 translates the first electrical signal 60 and the second electrical signal 64 into digital values. The RTU flow computer 69 uses the digital value of the water differential pressure reading to calculate the volumetric flow rate of the liquid water 3 through the water dump valve 5. Similarly, the RTU flow computer 69 uses the digital value of the oil differential pressure reading to calculate the volumetric flow rate of the liquid oil 4 through the oil dump valve 6. The equation for the volumetric flow rate depends on the design of the water differential pressure device 11 and the design of the oil differential pressure device 19. In the preferred embodiment of the present invention, the volumetric flow rate through a venturi tube is $$Q_v = CA_{throat}\sqrt{\frac{2\Delta p}{\rho(1-\beta^4)}}$$

where $Q_v$ is the volumetric flow rate, $A_{throat}$ is the cross-sectional area of the low pressure section, $\Delta p$ is differential pressure, $\rho$ is the flowing density of the liquid, and $\beta$ is the ratio between the diameter of the low pressure section and the diameter of the high pressure section. The RTU flow computer 69 is connected to the first sensor 59 by a first electronic connection 61 and is connected to the second sensor 63 by the second electronic connection 65.

In addition to the first sensor 59 and the second sensor 63, a temperature measuring device 66 is attached to the thermowell of the three phase separator 1 in order to obtain a water temperature reading and an oil temperature reading. The temperature measuring device 66 converts the water temperature reading and the oil temperature into a third electrical signal 67. The temperature measuring device 66 sends the third electrical signal 67 along a third electronic connection 68 to the RTU flow computer 69. The RTU flow computer 69 changes the third electrical signal 67 into a digital value for the water temperature and a digital value for the oil temperature. The temperature and pressure values are used to calculate the density changes in the liquid water 3 in real time and the density changes in the liquid oil 4 in real time because the volumetric flow rate depends on the density of the flowing liquid. In the preferred embodiment, the temperature measuring device 66 is an RTD (Resistive Thermal Device).

Finally, the RTU flow computer 69 exchanges information with a SCADA (Supervisory control and data acquisition) system 71 by a data transfer connection 70. In the preferred embodiment, the data transfer connection 70 is either a 232 communication link or a 485 communication link. The SCADA system 71 is an industrial computer control system used to monitor the three phase separator 1.

For the maintenance of the present invention, the startup procedure shall begin after all components have been properly installed and programmed to complete the real time liquid measurement calculations. All safety and maintenance procedures are important to follow in order to protect all personnel and the equipment involved in the method. The safety and maintenance procedures should include an isolation of the equipment procedure, a lock out or tag out procedure.

In the preferred embodiment, the multivariable differential transmitters could be dry calibrated to their prospective full scale values for static pressure, differential pressure, and temperature ranges. The multivariable differential transmitters can be left out of the pressurized service until the liquid levels are properly set and the liquid levels remain balanced in the upper sight glass of the three phase separator 1.

Level control is accomplished by priming the three phase separator 1 so that the three phase separator 1 has a separate liquid water level and a separate liquid oil level in the control boxes. The float level controls are properly adjusted to maintain the liquid water level and the liquid oil level. The multivariable differential transmitters can be pressurized and put into service after the liquid water level and the liquid oil level are set.

The high water pressure sensing line 27, the low water pressure sensing line 30, the high oil pressure sensing line 33, and the low oil pressure sensing line 36 must be purged of any gas bubbles so that the measurements are made only on the liquid water 3 and the liquid oil 4. Any gases left in the sensing lines will cause measurement errors.

The zero under pressure calibration is the last part of the safety and maintenance procedures. The multivariable differential transmitters must be in service with the sensing lines completely open and with the three phase separator 1 in a no flow condition. The three phase separator's downstream dump valve must be closed in a no leak condition. The multivariable differential transmitters are then calibrated to zero under pressure. The zero under pressure calibration has to be preformed to compensate for the head pressure difference between the sensing tubes and the differential pressure devices.

Although the invention has been explained in relation to its preferred embodiment, it is to be understood that many other possible modifications and variations can be made without departing from the spirit and scope of the invention as hereinafter claimed.

What is claimed is:

1. An internal liquid measurement and monitoring system for a three phase separator comprises:

said three phase separator being penetrated by a water extension fitting;
a water dump valve being mounted outside of said three phase separator;
a water differential pressure device being located inside of said three phase separator;
said water differential pressure device and said water dump valve being in serial fluid communication with each other through said water extension fitting;
a first sensor being in parallel fluid communication with said water differential pressure device by a high water pressure sensing line and a low water pressure sensing line;
said first sensor being electronically connected to a remote transmission unit (RTU) flow computer;
said three phase separator being penetrated by an oil extension fitting;
an oil dump valve being mounted outside of said three phase separator;
an oil differential pressure device being located inside of said three phase separator;
said oil differential pressure device and said oil dump valve being in serial fluid communication with each other through said oil extension fitting;
a second sensor being in parallel fluid communication with said oil differential pressure device by a high oil pressure sensing line and a low oil pressure sensing line;
said second sensor being electronically connected to said RTU flow computer;
a temperature measuring device for said three phase separator being electronically connected to said RTU flow computer; and
said RTU flow computer being communicably coupled to a supervisory control and data acquisition system (SCADA).

2. The internal liquid measurement and monitoring system for a three phase separator as claimed in claim 1 comprises:

said water differential pressure device comprises a water inlet, a high water pressure section, a high water pressure tap, a low water pressure section, a low water pressure tap, and a water outlet;
said water inlet, said high water pressure section, said low water pressure section, and said water outlet being connected collinearly to each other;
said high water pressure tap being positioned on said high water pressure section;
said low water pressure tap being positioned on said low water pressure section; and
said water outlet being connected to said water extension fitting by a first adhesive.

3. The internal liquid measurement and monitoring system for a three phase separator as claimed in claim 1 comprises:

said oil differential pressure device comprises an oil inlet, a high oil pressure section, a high oil pressure tap, a low oil pressure section, a low oil pressure tap, and an oil outlet;
said oil inlet, said high oil pressure section, said low oil pressure section, and said oil outlet being connected collinearly to each other;
said high oil pressure tap being positioned on said high oil pressure section;
said low oil pressure tap being positioned on said low oil pressure section; and
said oil outlet being connected to said oil extension fitting by a second adhesive.

4. The internal liquid measurement and monitoring system for a three phase separator as claimed in claim 1 comprises:

said high water pressure sensing line comprises a high water pressure device end and a high water pressure manifold end;
said low water pressure sensing line comprises a low water pressure device end and a low water pressure manifold end;
said water differential pressure device comprises a high water pressure tap and a low water pressure tap;
said first sensor having a first manifold;
said high water pressure device end being attached to said high water pressure tap;
said low water pressure device end being attached to said low water pressure tap;
said high water pressure manifold end being attached to said first manifold; and
said low water pressure manifold end being attached to said first manifold.

5. The internal liquid measurement and monitoring system for a three phase separator as claimed in claim 1 comprises:
said high oil pressure sensing line comprises a high oil pressure device end and a high oil pressure manifold end;
said low oil pressure sensing line comprises a low oil pressure device end and a low oil pressure manifold end;
said oil differential pressure device comprises a high oil pressure tap and a low oil pressure tap;
said second sensor having a second manifold;
said high oil pressure device end being attached to said high oil pressure tap;
said low oil pressure device end being attached to said low oil pressure tap;
said high oil pressure manifold end being attached to said second manifold; and
said low oil pressure manifold end being attached to said second manifold.

6. The internal liquid measurement and monitoring system for a three phase separator as claimed in claim 1 comprises:
said three phase separator having an inspection plug hole;
a replacement fitting being positioned into said inspection plug hole;
said replacement fitting comprises a high water pressure fitting hole, a low water pressure fitting hole, a high oil pressure fitting hole, and a low oil pressure fitting hole;
said high water pressure sensing line traversing through said high water pressure fitting hole;
said low water pressure sensing line traversing through said low water pressure fitting hole;
said high oil pressure sensing line traversing through said high oil pressure fitting hole; and
said low oil pressure sensing line traversing through said low oil pressure fitting hole.

7. The internal liquid measurement and monitoring system for a three phase separator as claimed in claim 6 comprises:
a plurality of shut-off valves being attached along said high water pressure sensing tube, said low water pressure sensing tube, said high oil pressure sensing tube, and said low oil pressure sensing tube; and
said plurality of shut-off valves being attached adjacent to said replacement fitting.

8. The internal liquid measurement and monitoring system for a three phase separator as claimed in claim 1 comprises:
said water dump valve being connected to said water extension fitting by a water dump valve body;
a high water pressure inside tube being located inside said three phase separator;
a high water pressure tunnel traversing through said water dump valve body;
a high water pressure outside tube being located outside said three phase separator;
said high water pressure inside tube, said high water pressure tunnel, and said high water pressure outside tube being connected inline to each other in order to form said high water pressure sensing line;
a low water pressure inside tube being located inside said three phase separator;
a low water pressure tunnel traversing through said water dump valve body;
a low water pressure outside tube being located outside said three phase separator; and
said low water pressure inside tube, said low water pressure tunnel, and said low water pressure outside tube being connected inline to each other in order to form said low water pressure sensing line.

9. The internal liquid measurement and monitoring system for a three phase separator as claimed in claim 8 comprises:
a plurality of shut-off valves being attached along said high water pressure sensing tube and said low water pressure sensing tube; and
said plurality of shut-off valves being attached adjacent to said water dump valve body.

10. The internal liquid measurement and monitoring system for a three phase separator as claimed in claim 1 comprises:
said oil dump valve being connected to said oil extension fitting by an oil dump valve body;
a high oil pressure inside tube being located inside said three phase separator;
a high oil pressure tunnel traversing through said oil dump valve body;
a high oil pressure outside tube being located outside said three phase separator;
said high oil pressure inside tube, said high oil pressure tunnel, and said high oil pressure outside tube being connected inline to each other in order to form said high oil pressure sensing line;
a low oil pressure inside tube being located inside said three phase separator;
a low oil pressure tunnel traversing through said oil dump valve body;
a low oil pressure outside tube being located outside said three phase separator; and
said low oil pressure inside tube, said low oil pressure tunnel, and said low oil pressure outside tube being connected inline to each other in order to form said low oil pressure sensing line.

11. The internal liquid measurement and monitoring system for a three phase separator as claimed in claim 10 comprises:
a plurality of shut-off valves being attached along said high oil pressure sensing tube and said low oil pressure sensing tube; and
said plurality of shut-off valves being attached adjacent to said oil dump valve body.

12. The internal liquid measurement and monitoring system for a three phase separator as claimed in claim 1 comprises:
said first sensor being connected to said RTU flow computer by a first electronic connection; and
said second sensor being connected to said RTU flow computer by a second electronic connection.

13. The internal liquid measurement and monitoring system for a three phase separator as claimed in claim 1 comprises:

said temperature measuring device being mounted onto said three phase separator; and said temperature measuring device being connected to said RTU flow computer by a third electronic connection.

14. The internal liquid measurement and monitoring system for a three phase separator as claimed in claim 1 comprises:

said RTU flow computer being communicably coupled to said SCADA system by a data transfer connection.

15. A method of operating the internal liquid measurement and monitoring system as claimed in claim 1 to accurately measure a volumetric flow rate of a liquid water exiting a three phase separator, the method comprises the steps of:

providing a gas, said liquid water, and a liquid oil, wherein said gas, said liquid water, and said liquid oil is stored within said three phase separator;

actuating said water dump valve in order to siphon said liquid water out of said three phase separator;

creating a higher static pressure and a lower static pressure across said water differential pressure device as said liquid water flows through said water differential pressure device;

measuring said higher static pressure and said lower static pressure with said first sensor in order to determine a differential pressure for said liquid water;

measuring temperature of said liquid water with a temperature measuring device in order to determine a density for said liquid water;

sending measurement data from said first sensor and from said temperature measuring device to said RTU flow computer;

calculating said volumetric flow rate of said liquid water with said RTU flow computer, wherein said volumetric flow rate mathematically depends on said differential pressure and said density for said liquid water; and sending said volumetric flow rate of said liquid water to said SCADA system.

16. The method of operating the internal liquid measurement and monitoring system to accurately measure a volumetric flow rate of liquid water exiting a three phase separator, as claimed in claim 15 comprises the steps of:

creating said higher static pressure within a high water pressure section of said water differential pressure device as said liquid water flows through said water differential pressure device;

fluidly communicating said higher static pressure to said first sensor through said high water pressure sensing line;

creating said lower static pressure within a low water pressure section of said water differential pressure device as said liquid water flows through said water differential pressure device; and fluidly communicating said lower static pressure to said first sensor through said low water pressure sensing line.

17. The method of operating the internal liquid measurement and monitoring system to accurately measure a volumetric flow rate of liquid water exiting a three phase separator, as claimed in claim 15 comprises the steps of:

wherein said higher static pressure and said lower static pressure, and said differential pressure of said liquid water is said measurement data from said first sensor;

sending said measurement data from said first sensor along a first electronic connection between said first sensor and said RTU flow computer;

wherein said temperature of said liquid water is said measurement data from temperature measuring device;

sending said measurement data from temperature measuring device along a third electronic connection between said temperature measuring device and said RTU flow computer; and sending said volumetric flow rate of said liquid water along a data transfer connection between said RTU flow computer and said SCADA system.

18. A method of operating the internal liquid measurement and monitoring system as claimed in claim 1 to accurately measure a volumetric flow rate of liquid oil exiting a three phase separator, comprises the steps of:

providing a gas, a liquid water, and a liquid oil, wherein said gas, said liquid water, and said liquid oil is stored within said three phase separator;

actuating said oil dump valve in order to siphon said liquid oil out of said three phase separator;

creating a higher static pressure and a lower static pressure across said oil differential pressure device as said liquid oil flows through said oil differential pressure device;

measuring said higher static pressure and said lower static pressure with said second sensor in order to determine a differential pressure for said liquid oil;

measuring temperature of said liquid oil with a temperature measuring device in order to determine a density for said liquid oil;

sending measurement data from said second sensor and from said temperature measuring device to said RTU flow computer;

calculating said volumetric flow rate of said liquid oil with said RTU flow computer, wherein said volumetric flow rate mathematically depends on said differential pressure and said density for said liquid oil; and sending said volumetric flow rate of said liquid oil to said SCADA system.

19. The method of operating the internal liquid measurement and monitoring system to accurately measure a volumetric flow rate of liquid oil exiting a three phase separator, as claimed in claim 18 comprises the steps of:

creating said higher static pressure within a high oil pressure section of said oil differential pressure device as said liquid oil flows through said oil differential pressure device;

fluidly communicating said higher static pressure to said second sensor through said high oil pressure sensing line;

creating said lower static pressure within a low oil pressure section of said oil differential pressure device as said liquid oil flows through said oil differential pressure device; and fluidly communicating said lower static pressure to said second sensor through said low oil pressure sensing line.

20. The method of operating the internal liquid measurement and monitoring system to accurately measure a volumetric flow rate of liquid oil exiting a three phase separator, as claimed in claim 18 comprises the steps of:

wherein said higher static pressure and said lower static pressure, and said differential pressure of said liquid oil is said measurement data from said second sensor;

sending said measurement data from said second sensor along a second electronic connection between said second sensor and said RTU flow computer;

wherein said temperature of said liquid oil is said measurement data from temperature measuring device;

sending said measurement data from temperature measuring device along a third electronic connection between said temperature measuring device and said RTU flow computer; and sending said volumetric flow rate of said liquid oil along a data transfer connection between said RTU flow computer and said SCADA system.

\* \* \* \* \*